Feb. 24, 1953 T. N. WILLCOX ET AL 2,629,132
MOLDING APPARATUS
Filed Oct. 27, 1950
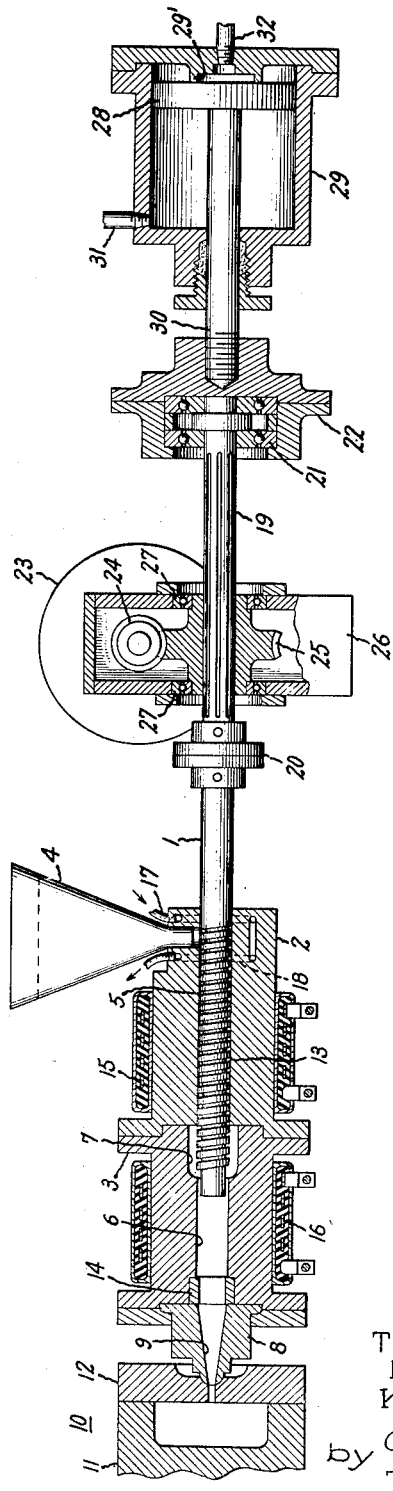
Inventors:
Thomas N. Willcox,
Marvin E. Gale,
Kurt R. Stadthaus,
by Abraham Cohen.
Their Attorney.

Patented Feb. 24, 1953

2,629,132

UNITED STATES PATENT OFFICE 2,629,132

MOLDING APPARATUS

Thomas N. Willcox, Nutley, N. J., and Marvin E. Gale and Kurt R. Stadthaus, Pittsfield, Mass., assignors to General Electric Company, a corporation of New York Application October 27, 1950, Serial No. 192,444

1 Claim. (Cl. 18—30)

Our invention relates to improved apparatus for plasticizing and extruding or injection molding thermoplastic materials.

Apparatus for plasticizing and molding thermoplastic materials has been provided in which the material is heated as it is fed from a suitable supply receptacle, such as a hopper, through a nozzle from which it is extruded or injected into a mold. One of the disadvantages of prior art apparatus of this general type is the difficulty in attaining the control of temperature of the various parts of the apparatus necessary to effect adequate plasticizing without overheating and burning at least some of the material. If the temperature is sufficiently low to avoid the danger of burning, there is a tendency for the material to build up or clog the injection apparatus. As a result of these disadvantages, the prior art apparatus has, in general, operated at very high injection pressures, in the order of twenty thousand pounds per square inch, for example, with the result that the molding operation could not be carried out at as high speeds as desired. The difficulty experienced in maintaining the desired temperatures throughout the apparatus also rendered it difficult to effect adequate plasticizing of the material and elimination of trapped air from the end product.

In accordance with an important aspect of our invention, disadvantages of the type discussed above are overcome by providing in apparatus for plasticizing and feeding the material a single member mounted for both longitudinal and rotary motion and provided with a threaded portion so that the member functions both as a plunger and a screw feed and plasticizer.

Further objects and advantages of our invention will become apparent as the following description proceeds, reference being had to the accompanying drawing in which the single figure is an elevational view, in section, of plasticizing and injection apparatus embodying our invention.

Referring now to the drawing, the preferred embodiment of our invention there illustrated includes a combined plasticizing screw and plunger 1 which is supported for rotation and longitudinal movement with respect to the body of the plasticizing head provided by cylinders 2 and 3 through which the thermoplastic material to be extruded or molded is fed. As illustrated, the thermoplastic material is retained within a hopper 4, which communicates at its lower end with a longitudinally extending bore 5 in the cylinder 2. The cylinder 3 is provided with a corresponding bore 6 in alignment with the bore 5 of the cylinder 2. In the preferred embodiment illustrated, an enlarged portion or chamber 7 is provided at the end of the bore 6 near the end of the plunger 1 in its retracted position. The chamber assists in effecting thorough mixing of any pigment that may be added to the material. At the left hand or outlet end of the cylinder 3, there is provided a nozzle member 8 having a tapered opening 9 through which the material is extruded or injected into the mold designated generally by the numeral 10 and including a body 11 and a cover plate 12.

The member 1 extends into the aligned bores 5 and 6 of the cylindrical cylinders 2 and 3 and is threaded throughout a substantial intermediate portion of the length thereof received within the bores, as indicated by numeral 13. The forward end of the member 1 is unthreaded and has a diameter equal to the root diameter of the threads. This member is adapted to seat against a cylindrical bushing 14 at the end of the cylinder 3 and adjacent the inner end of the nozzle 8.

In order to control the temperature of the thermoplastic material, means are provided for heating the cylinders 2 and 3. As illustrated in the drawing, generally cylindrical electrical heater elements 15 and 16 surround the cylinders 2 and 3 and are energized through suitable control circuits (not shown) in a manner which will be readily understood by those skilled in the art.

In order to maintain the end of the cylinder 2 adjacent the hopper at a temperature sufficiently low to prevent burning or sticking of the material, it may be desirable to provide for the passage of cooling fluid. To this end, fluid passages 17 and 18 are provided at the inlet end of the cylinder 2 in the region surrounding the outlet of the hopper and also surrounding the bore 5 within which the screw feed and plasticizing plunger 1 is received.

As hereinabove indicated, the member 1 is supported for longitudinal and rotational motion relative to the plasticizing head, including cylinders 2 and 3. As illustrated in the drawing, the member 1 is coupled to one end of a splined shaft 19 by means of a suitable shaft coupling 20. The other end of the splined shaft is suitably received within a ball bearing 21 supported in a bearing housing 22. Means for rotating the splined shaft while permitting its longitudinal movement are provided by a worm gear drive including an electric motor 23 connected to a worm gear 24 and worm wheel 25 which are supported in a gear housing 26, the worm wheel being supported for rotation with respect to the housing on suitable bearings 27. The shaft 1, and, as a result, the plunger and screw feed member 1, are readily movable in a longitudinal direction, due to the splined connection between the shaft 19 and the worm wheel 25.

The longitudinal or plunger action of the member 1 is effected by a suitable operating piston 28 received within a cylinder 29 and connected to the bearing housing 22 by means including a piston rod 30. The cylinder 29 is provided with suitable fluid supply and exhaust conduits 31 and 32 which may be suitably connected to a supply of fluid under pressure and an exhaust conduit system under the control of a valve arrangement (not shown).

In the operation of the illustrated embodiment of our invention, the thermoplastic material is loaded in the hopper 4. Apparatus embodying the present invention is suitable for general use with thermoplastic materials, including the organic derivatives of cellulose, such as cellulose acetate, ethyl cellulose, and the like, thermoplastic vinyl compounds, such as polyvinyl chloride, polystyrene, and the like. These materials may, in accordance with the usual practice, include plasticizers or softening agents well known in the art. With the member 1 in the position shown in the drawing, it is rotated to advance material from the hopper along the screw portion 13 toward the bore 6 and chamber 7. As the material is advanced, it is separated into small quantities included in the passages defined by the threaded portion 13 and brought into intimate contact with the bore 5 so that the material is readily heated. This action of the screw also works the material thoroughly and may to advantage be made to effect the final mixing of the thermoplastic material with a coloring agent, if desired. As the screw continues to rotate, material is fed to fill the bore 6 and chamber 7. The longitudinal movement of member 1 is controlled by piston 28, which, at this point, is against a stop 29' at the right hand end of the cylinder 3. At an appropriate time, fluid is admitted through the conduit 32 to the right hand side of the piston 28 to move the member longitudinally through the bore 6 and chamber 7 into engagement with the bushing 14, during which time the material is forced through the nozzle 8 into the mold 10. As member 1 is thus moved longitudinally, the unthreaded rearward portion of the member moves along bore 5 into sealing position with the inlet at the lower end of hopper 4. The member 1 is allowed to remain in its left hand position for a brief interval of time sufficient for initial setting of the thermoplastic material within the mold after which it is retracted by introducing fluid under pressure through conduit 31 to the left hand side of piston 28 while the right hand side of the piston 28 communicates through conduit 32 with an exhaust passage. Rotation of the screw during retracting moves feed material toward bore 6 and as rotation continues the bore 6 and chamber 7 are again filled with material ready to be forced into a mold upon the next longitudinal movement of member 1 as a plunger under the control of piston 28. As will be readily appreciated, the apparatus illustrated in the drawing may be incorporated in automatic machinery in which the operation of the member 1 is correlated with the movement of molds into operative relationships to the nozzle 8.

While we have shown a particular embodiment of our invention, it will be understood, of course, that we do not wish to be limited thereto, since many modifications may be made, and we, therefore, contemplate by the appended claim to cover any such modifications as fall within the true spirit and scope of our invention.

What we claim as new and desire to secure by Letters Patent of the United States is:

Apparatus for plasticizing and feeding thermoplastic material comprising a plasticizing head defining an elongated passage, a cylindrical bushing at the forward end of said passage, inlet means for introducing thermoplastic material into said passage near the other end thereof, an elongated member received within said passage and including an intermediate threaded portion, the forward and rearward ends of said elongated member being unthreaded with a portion of the unthreaded rearward end extending into said passage adjacent said inlet means, said passage having a larger cross section intermediate the ends thereof and near the forward end of said elongated member in its retracted position, means supporting said member for rotation and reciprocating movement with respect to said head to move said material along said passage under the action of said threaded portion and to eject the material from the forward end of said passage upon longitudinal movement of said member, the forward end of said member seating against said cylindrical bushing when said member is in the advanced position following ejection of the material, and the unthreaded rearward end of said member sealing said inlet means during movement of said member to its advanced position.

THOMAS N. WILLCOX.
MARVIN E. GALE.
KURT R. STADTHAUS.

REFERENCES CITED

The following references are of record in the file of this patent:

UNITED STATES PATENTS

| Number | Name | Date |
|---|---|---|
| 2,359,839 | Goessling | Oct. 10, 1944 |
| 2,567,147 | Cousino | Sept. 4, 1951 |

FOREIGN PATENTS

| Number | Country | Date |
|---|---|---|
| 855,885 | France | Feb. 26, 1940 |